United States Patent [19]
Ochi

[11] Patent Number: 5,971,924
[45] Date of Patent: Oct. 26, 1999

[54] ULTRASONIC DIAGNOSTICS APPARATUS

[75] Inventor: Masumi Ochi, Tochigi-ken, Japan

[73] Assignee: Kabushiki Kaisha Toshiba, Kawasaki, Japan

[21] Appl. No.: 09/037,542

[22] Filed: Mar. 10, 1998

[30] Foreign Application Priority Data

Mar. 10, 1997 [JP] Japan .................................. 9-054737

[51] Int. Cl.[6] .................................................... A61B 8/00

[52] U.S. Cl. ............................................................ 600/443

[58] Field of Search ..................................... 600/440, 441, 600/443, 454–455

[56] References Cited

U.S. PATENT DOCUMENTS

| | | | |
|---|---|---|---|
| 5,215,094 | 6/1993 | Franklin et al. | 600/458 X |
| 5,503,153 | 4/1996 | Liu et al. | 73/861.25 X |
| 5,718,229 | 2/1998 | Pesque et al. | 600/441 |

FOREIGN PATENT DOCUMENTS 2-144049  6/1990  Japan .

OTHER PUBLICATIONS

Roberto M. Lang, et al, "Echocariographic Quantification of Regional Left Ventricular Wall Motion with Color Kinesis" Circulation, vol. 93, No. 10, (May 15, 1996), pp. 1877–1885.

*Primary Examiner*—Francis J. Jaworski
*Attorney, Agent, or Firm*—Oblon, Spivak, McClelland, Maier & Neustadt, P.C.

[57] ABSTRACT

The interior of a subject to be examined is scanned with an ultrasonic wave through an ultrasonic probe. Original image data is created based on a signal obtained. The original image data is image-processed. The image-processed image data is displayed. In the image processing, the original image data is compared at each pixel with a predetermined threshold value. If being higher than a threshold value, the original data is selected at each pixel. If, on the other hand, the original image data is lower than the threshold value, image data image-processed previous to one frame or a few frames is selected at each pixel. The image data selected for each pixel is displayed as newly image-processed image data. If the original image data is thus lower than the threshold value, the image data image-processed previous to one frame or a few frames is selected and, when an object is in given motion, a residual image is displayed on a motion locus.

45 Claims, 6 Drawing Sheets

ULTRASONIC DIAGNOSTICS APPARATUS

BACKGROUND OF THE INVENTION

The present invention relates to an ultrasonic diagnostic apparatus for transmitting an ultrasonic wave to a subject to be examined, receiving an echo from the subject and creating an ultrasonic image on the basis of that echo signal.

In recent years, a B mode for representing a tissue structure in a subject's cross-section and a mode different from a color Dopper mode for representing, in color, a blood stream state in the subject cross-section have been developed in the field of the ultrasonic diagnosis. A tissue Dopper imaging mode allows the extraction of only a lower Dopper frequency and the imaging of a slow motion alone of the cardiac muscle for instance. And the color kinesis mode provides an easy-to-acquire tissue motion by extracting an endocardial boundary and overlaying those boundaries at different o'clock time phases in different colors.

The 3-dimensional mode image enables a 3-D image to be constructed from a plurality of images obtained from the multi-slices of the subject.

Of these, the 3D mode is of high clinical significance and has recently received attention. The 3D mode involves a vast amount of data and presents the problems with an increase in circuit size, a rise in cost and a slight loss in real time.

Some recent ultrasonic diagnostics apparatus achieve a frame rate (high time resolution) of as high as 50 frames/second. On the other hand, the dynamic capability of the human eyes is restricted to 10 to 15 frames per second. For this reason, the observer simply acquires a portion of rich information the above-mentioned high time resolution provides.

BRIEF SUMMARY OF THE INVENTION

It is accordingly the object of the present invention to provide an ultrasonic diagnostics apparatus which can create a novel image not so far obtained in this field of art.

According to the present invention, the interior of the subject is scanned with an ultrasonic wave with the use of an ultrasonic probe. Original image data is created based on a signal obtained and is image-processed. The image data, being so image-processed, is displayed. For the image processing, the original image data is compared with a predetermined threshold value pixel by pixel and is selected for each pixel when the original data is higher than the threshold value. When the original image data is lower than the threshold value, those image data image-processed previous to one frame or a few frames are selected at each pixel. The image data selected at each pixel is displayed as newly image-processed image data. When the original image data is thus lower than the threshold value, such image data image-processed previous to one or a few frames is selected, so that, when an object is moving, a residual image is displayed on a motion locus of the object. As a result, the observer can observe the action of the cardiac muscle, for instance, accurately or it is possible to observe an image approximate to a surface image of the object.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
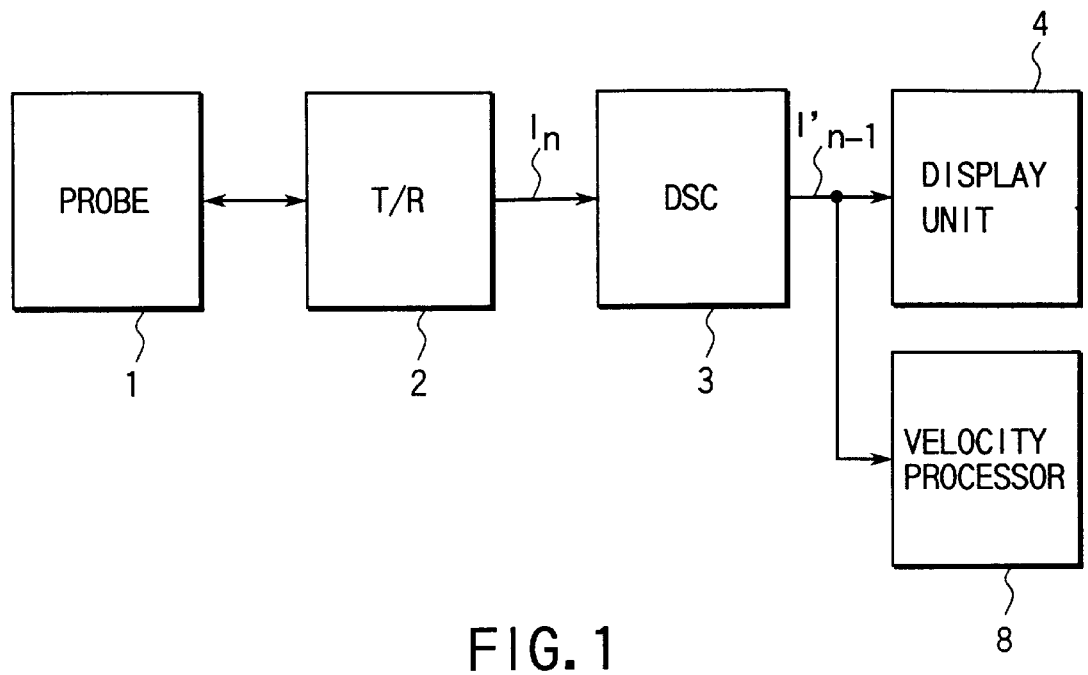
FIG. 1 is a functional block diagram showing an ultrasonic diagnostics apparatus according to a preferred embodiment of the present invention.

With reference to the drawing, explanation will be given below of an ultrasonic diagnostics apparatus according to a preferred embodiment of the present invention. An ultrasonic probe 1 has an array of oscillating elements. The oscillation element is comprised of a piezoelectric element with an electrode formed on both surfaces. The array type may be so formed as to allow a linear scan, a sector scan, a convex scan, etc. Here, the sector scan is assumed.

A transmit/receive circuit unit (T/R) 2 comprises a transmit section, a receive section and an image creator section. The transmit unit comprises a clock, a rate pulse generator, delay circuit and pulser. The rate pulse generator subjects a clock signal to frequency division to obtain a rate pulse of 5 KHz for instance. The rate pulse is so distributed as to correspond to a channel. A plurality of delay circuits, each, delay the rate pulse corresponding to the channel. This delay achieves the focusing and deflection of an ultrasonic wave. A plurality of pulsers are each triggered by a corresponding rate pulse and applied to the corresponding oscillating element. By doing so, the oscillating element is mechanically oscillated and the ultrasonic pulse is transmitted to the subject.

The ultrasonic wave is echoed at a boundary of acoustic impedance in the subject and the echo mechanically oscillates the probe's piezoelectric element, so that a potential difference is created across the electrodes of the oscillating element. The potential difference is taken as an electric signal. Within the receive section, those electric signals are amplified, delayed (phase-matched) and summed, so that echoes are enhanced from a controlled direction.

Based on the echo signals, an image creator section creates a B mode image (tissue slice image) and data of a Dopper image representing the blood stream and tissue's spatial action in the subject. Here, the B mode image is assumed.

The B mode data is image-processed by a digital scan converter (DSC) 3 and output by a digital scan converter (DSC) 3. The resultant B mode image data is displayed on a display unit 4. This image processing is done so as to artificially impart a residual image effect to the B mode image as will be set out in more detail below.

Here, the original image data directly output from the transmit/receive circuit unit 2, that is, not image-processed data, is represented by "I" and the image data subjected to image processing is represented by "I'". The frame numbers of the image data are attached to the "I" and "I'". The current frame number is indicated by "n". The sign "I'n" means "image-processed" image data corresponding to an n-th original image data; "In-1", n-1th original image data corresponding to one frame-previous image data; "I'n-1", "image-processsed" image data corresponding to the n-1-th original image.

Figure 2:
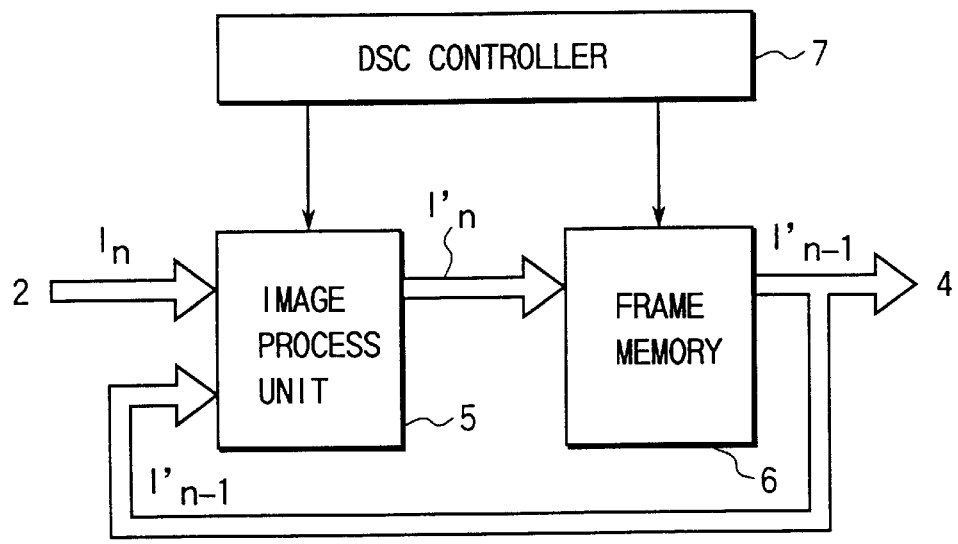
FIG. 2 is a functional block diagram showing a digital scan converter.

FIG. 2 shows a construction of the digital scan converter 3 in FIG. 1. The digital scan converter 3 includes not only a frame memory 6 for mainly converting image data of an ultrasonic scan system to one of a TV scan system but also an image process unit 5 for performing image processing characteristic of the present invention. A DSC controller 7 is so provided as to control an operation in the DSC3.

The image processing of the image process unit 5 is implemented by a software or hardware. If real-time processing is more important, hardware implementation may be preferable.

Figure 3:
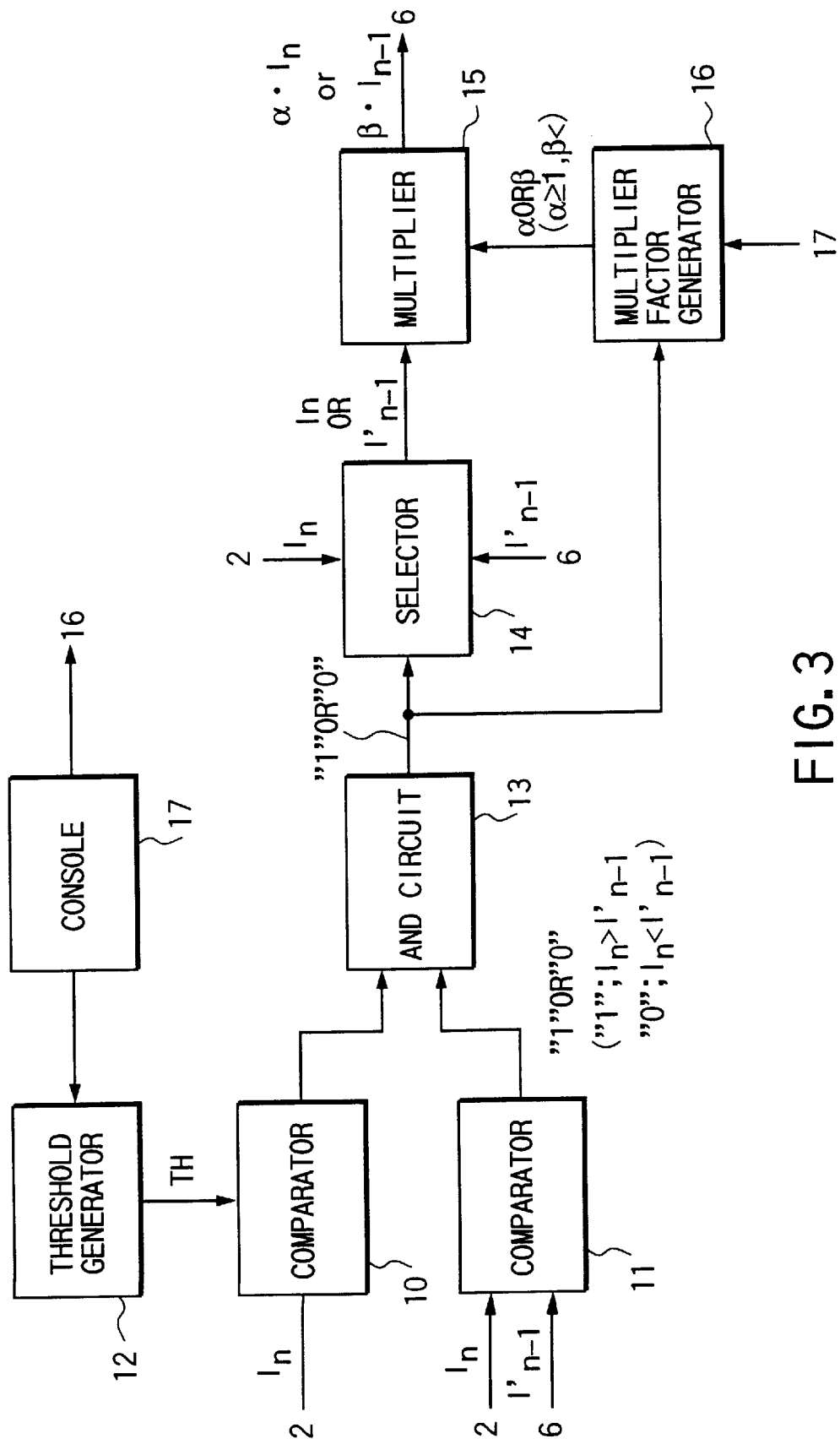
FIG. 3 is a functional block diagram showing a process unit in FIG. 2.

FIG. 3 shows a functional block circuit of an image process unit 5. The image processing is of such a feedback type as to allow image data I' which is subjected to image processing to be fed back to an image processing route. The image process unit 5 includes two comparators 10 and 11.

The comparator 10 compares, at each pixel, original image data In which comes from the transmit/receive circuit unit 2 with a threshold voltage (TH≧0) which comes from a threshold generator 12. The comparator 10 sets a flag "1" on an output terminal when In>TH and a flag "0" when In<TH.

It is to be noted that the threshold value TH supplied from the threshold generator 12 to the comparator 10 can freely be changed through a proper operation of a console 17.

On the other hand, the comparator 11 is supplied with original image data In coming from the transmit/receive circuit unit 2 and image data I'n-1 subjected to image processing is fed back to the comparator 11. The comparator 11 compares, at each pixel, the original image data In which comes from the transmit/receive circuit unit 2 with the image data I'n-1 which is subjected to image processing. The comparator 11 sets a flag "1" on an output terminal when In>I'n-1 and a flag "0" when In<I'n-1.

An AND circuit 13 produces a "1" on an output terminal when the outputs of the comparators 10 and 11 are "1" each and a "0" when at least one of the outputs of the two comparators 10 and 11 is a "0".

A selector 14 is supplied with original image data In coming from the transmit/receive circuit unit 2 and the image data I'n-1 subjected to image processing is fed back to the selector 14. One of the original image data In and image data I'n-1 subjected to image processing is selected, at each pixel, in accordance with the output state of the AND circuit 13.

A multiplier 15 multiplies the image data In or I'n-1 which is selected by the selector 14 at each pixel by a multiplier factor coming from a multiplier factor generator 16. The multiplier factor generator 16 supplies a multiplier factor α (α≧1) to the multiplier 15 when the AND circuit 13 produces an output "1" and a multiplier factor β (β<1) to the multiplier 15 when the AND circuit 13 produces an output "0". The output of the multiplier 15 becomes "α·In" or "β·I'n-1" at each pixel.

It is to be noted that the multipliers α, β supplied from the multiplier factor generator 16 to the multiplier 15 can be individually freely changed by properly operating the console 17 by the operator.

Through the frame memory 6, the multiplier 15 produces an output as image-processed image data I'n corresponding to the original image data In of a current frame. The image-processed image data I'n is converted by the display unit 4 to a luminance level in accordance with a gray scale and, after being given a concentration contrast, displayed on the display unit 4. Or the image-processed image data I'n is subjected to color conversion in accordance with a color bar and, after being given a color contrast, is displayed on the display unit.

The above-mentioned processes, being summarized, are as follows:

(1) When the pixel value of the original image data In of a current frame is higher than the threshold value TH and higher than a pixel value of the image data I'n-1 image-processed previous to one frame, then the pixel value of the original image data In of the current frame is multiplied by a multiplier factor a of 1 or greater.

(2) When the pixel value of the original image data of a current frame is lower than the threshold value TH or lower than the pixel value of the image data I'n-1 image-processed previous to one frame, then the pixel value of the image data I'n-1 image-processed previous to one frame is multiplied by a multiplier factor β of less than 1.

Figure 5:
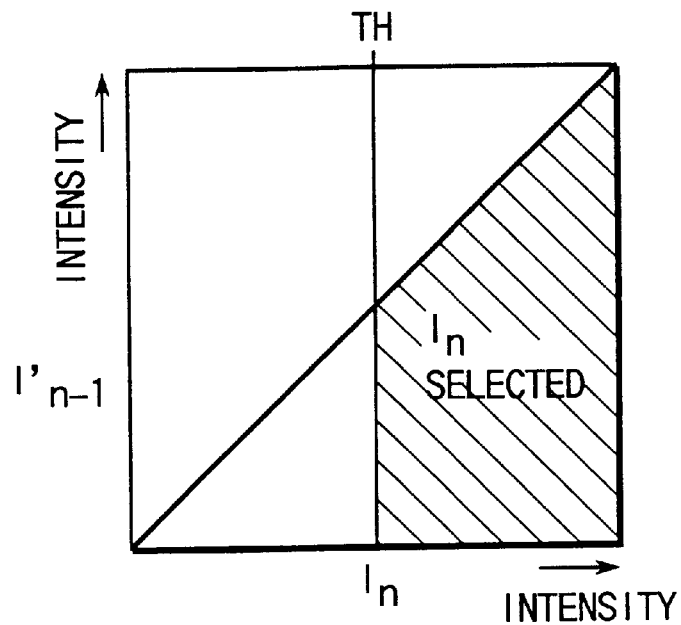
FIG. 5 is a view for explaining comparators, AND circuit and selector's operation in FIG. 3.
Figure 8:
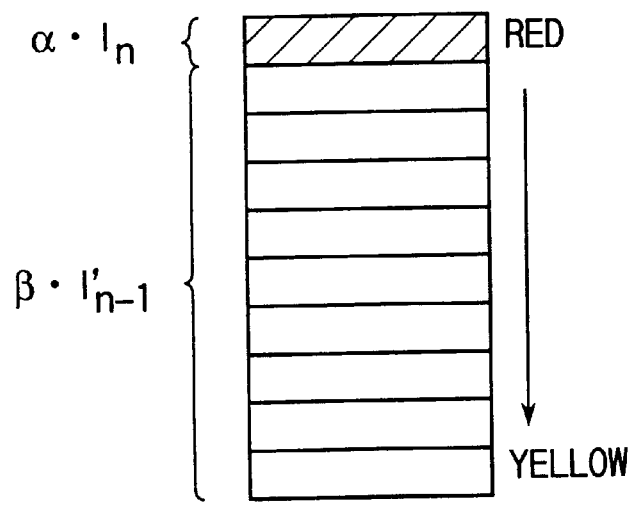
FIG. 8 is a view showing a color bar representing a residual image-processed image in color.

When, as shown in FIG. 5, the pixel value of the original image data of a current frame is higher than the threshold value and higher than the pixel value of the image data image-processed previous to one frame, the pixel value of the original image data of the current frame is selected and the pixel value is enhanced and, when outerwise, the pixel value of the pixel data image-processed previous to one frame is selected and a resultant pixel value is lowered.

Figure 4:
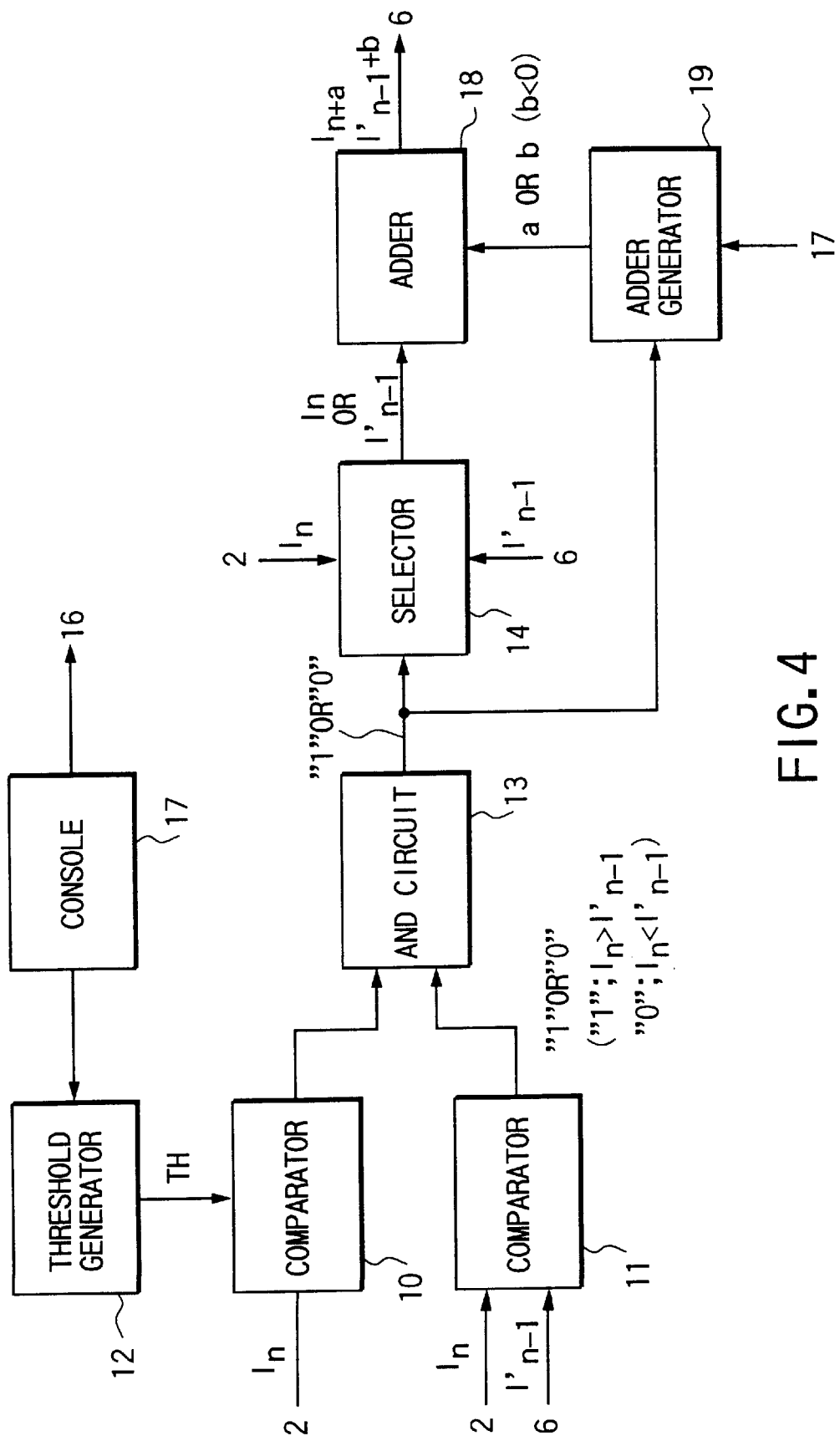
FIG. 4 is a functional block diagram showing another process unit in FIG. 2.

Such a pixel value enhancing/lowering operation can be achieved not only through the multiplying processing but also through an adding processing. As shown in FIG. 4, the multiplier 15 can be replaced by an adder 18 and the addend generator 16 can be replaced by an addend generator 19. The addend generator 19 supplies an addend a (a≧0) to the adder 18 when an AND circuit produces an output "1" and an addend b (b<0) to the adder 18 when the AND circuit 13 produces an output "0". The adder 18 produces an output "In+a" or "I'n-1+b" at each pixel. The addends a and b supplied from the adder generator 19 to the adder 18 can be individually freely changed by properly operating the console 17 by the operator.

If the above-mentioned image processing is done in a situation in which the positional relation between the object and the ultrasonic scanning surface is varying, a residual image effect is exhibited because the image information previous to a current frame is displayed, in a weak level, together with an image of the current frame. The above-mentioned situation may include for example, that of the scanning the heart of the subject with the probe 1, for instance, substantially fixed to the body surface of the subject and that of moving an ultrasonic scanning surface across an object submerged in the water.

Figure 6A:
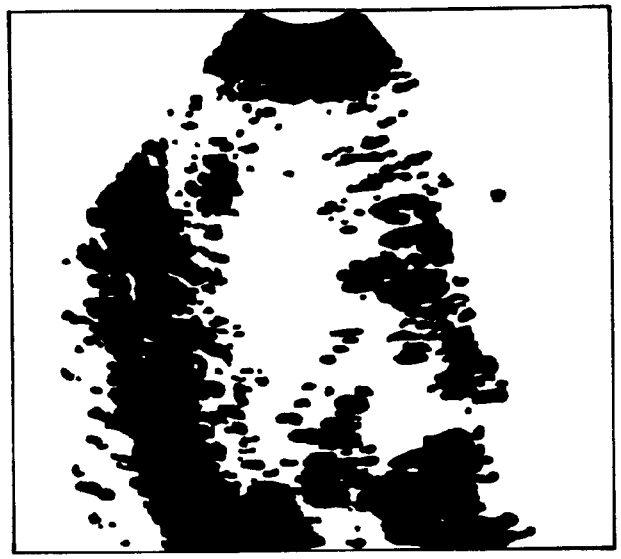
FIG. 6A is a view showing a cross-sectional image of a residual image-processed heart.
Figure 6B:
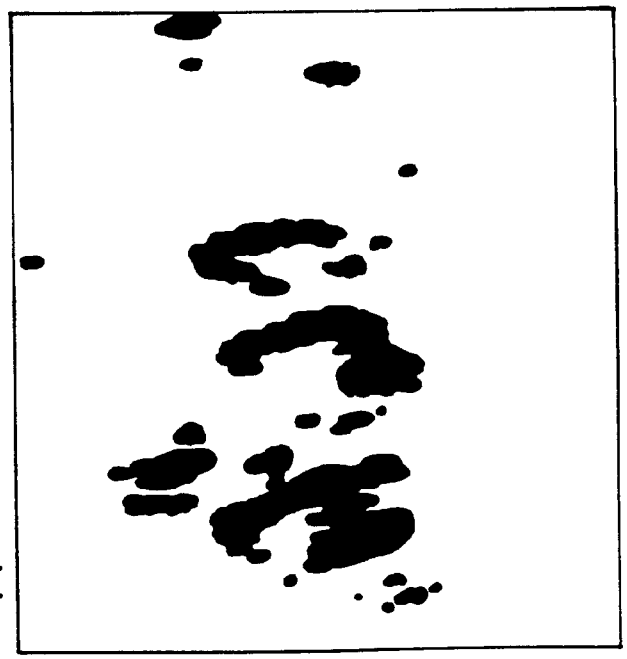
FIG. 6B is a macrograph showing a portion of image of FIG. 6A.

In the former situation in FIGS. 6A and 6B, since the cardiac muscle is displayed in a high luminance level at a current position and in a low luminance level at a previous position, it is possible to display, as the residual image, those cardiac muscle images corresponding to a few previous frames. From such residual images it is possible to readily understand a locus corresponding to the motion of the cardiac muscle. The manner of the cardiac muscle's respective areas being moved in loop-like motion can be grasped from the cross-sectional image of FIGS. 6A and 6B.

The length of the residual image, that is, how far back the current image should be displayed in connection with those images corresponding to a few previous frames, substantially depends upon the multiplier factor β and addend b. This may freely be adjusted while viewing the image involved.

Further, the enhancing level of the cardiac muscle's image of the current frame is determined depending upon the multiplier factor α and the operator may freely adjust this level while viewing the image on the display unit. When the multiplier factor a is made very high, the α·In is saturated relative to a gray scale or a color bar. That is, the original image data exceeding the threshold value, i.e., the image of the cardiac muscle corresponding to the current frame is displayed always at a maximal luminance level or in a pure red tone level. By doing so, it is possible for the observer to readily observe an image of a current cardiac image.

In the latter situation in which the ultrasonic scanning surface is moved across an object submerged in the water, it is possible to create a pseudo 3-dimensional image, here, an image approximate to a surface image.

Figure 7A:
FIG. 7A is a view showing a residual image-processed image (one o'clock time phase) of a toy (crocodile) submerged in the water.
Figure 7B:
FIG. 7B is a view showing a residual image-processed image (two o'clock time phase) of a toy (crocodile) submerged in the water.
Figure 7C:
FIG. 7C is a view showing a residual image-processed image of a toy (crocodile) submerged in the water.

FIGS. 7A, 7B and 7C show "three o'clock" time phase images when a water-submerged toy crocodile is imaged by the image processing of the present invention. An acoustic impedance between the surface of the toy crocodile and the water is very large and, therefore, the intensity of an echo from the surface of the toy crocodile is much higher than that of an echo from other than the surface of the toy crocodile. Thus, the original image represents an outline of the toy crocodile surface. Since the outline remains as a residual image effect, it is possible to create an image approximate to the surface image.

In the explanation thus far given, the image processing is repeated each time any new original image is created. The image processing may be intermittently executed a few frames at a time. By doing so, like a stroboscopic action, the motion locus of the same area can be displayed as a discrete array of dots. Such an operation can be realized by varying a control pattern of the DSC controller 7 relative to the image process unit 5 and frame memory 6. That is, the image process unit 5 takes in the original image data a few frames at a time and discards (partly cuts off) the other original image data. The image process unit 5 creates new image data from the taken-in original image data and those image data image-processed previous to a few frames. Further, the image-processed image data is read out in a given period from the frame memory 6. During the partial cutting-off period, however, the same image data is repeatedly read out (freeze operation). By such an operation, the motion locus like the stroboscopic action is displayed as a discrete array of dots.

Based on such a discrete array of dots, the velocity processor 8 can approximately find the motion velocity and an absolute velocity not dependent upon that angle dependence. That is, the distance between two points in an adjacent pair on the same area corresponds to the motion velocity and, by converting it to a corresponding hour or second velocity in accordance with the taken-in period, it is possible to easily calculate the motion velocity.

According to the present invention it is possible to observe the locus of a motion object such as the cardiac heart and the observer can fully understand the motion of an object from the locus. Further, an image approximate to the object's surface image can be acquired while solving the problem with an increase in circuit size, a rise in cost and a slight loss in real time.

Needless to say, various changes or modifications of the present invention can be made without being restricted to the above-mentioned embodiments.

Further example, it may be possible to not only individually display image-processed image data but also, through the digital scan converter 3, make a switching to a frame composition of the original image data of a current frame onto image-processed image data of a current frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An ultrasonic diagnostics apparatus comprising:
   an ultrasonic probe;
   means for scanning an interior of a to-be-examined subject by the ultrasonic probe and for creating original image data based on a signal obtained;
   image processing means for image-processing the original image data; and
   means for displaying the image-processed image data, wherein the image processing means comprises
   means for comparing the original image data with a predetermined threshold value at each pixel, and
   means for selecting the original image data at each pixel when a predetermined original image data is higher than the threshold value and image data, at each pixel, image-processed previous to one frame or a few frames when the original image data is lower than the threshold value.

2. An apparatus according to claim 1, wherein the image processing means further comprises means for multiplying the selected original image data by a multiplier factor α (α≧1) and the selected image-processed image data by a multiplier factor β (β<1).

3. An apparatus according to claim 2, wherein the image processing means further comprises means for varying the multiplier factors α and β.

4. An apparatus according to claim 2, wherein the multiplier factor α is so set that the selected original image data is displayed at a maximal luminance level or a pure color tone level.

5. An apparatus according to claim 1, wherein the image processing means further comprises means for adding an addend a (a≧0) to the selected original image data and an addend b (b<0) to the selected image-processed image data.

6. An apparatus according to claim 5, wherein the image processing means further comprises means for varying the addends a and b.

7. An apparatus according to claim 1, wherein the addend a is so set that the selected original image data is displayed at a maximal luminance level or at a pure color tone level.

8. An apparatus according to claim 1, wherein the image processing means further comprises means for varying the threshold value.

9. An apparatus according to claim 1, further comprising means for composing the image-processed image data onto the original image data.

10. An apparatus according to claim 1, wherein the image processing means takes in the original image data at a rate of once for a plurality of frames and executes image processing the taken-in original image data as an object.

11. An apparatus according to claim 10, further comprising means for computing a region motion velocity based on both a distance between points of a pair on the same area described in the image data image-processed at a rate of once for a plurality of frames and an image processing executing period.

12. An ultrasonic diagnostics apparatus comprising:
an ultrasonic probe;
means for scanning an interior of a to-be-examined subject by the ultrasonic probe and for creating original image data based on a signal obtained;
image processing means for image-processing the original image data; and
means for displaying the image-processed image data, wherein the image processing means comprises
means for comparing the original image data with a predetermined threshold value at each pixel,
means for comparing the original image data, at each pixel, with image data image-processed previous to one frame or a few frames, and
means for selecting the original image data at each pixel when the original image data is higher than the threshold value and higher than the image data image-processed previous to one frame or a few frames and the image data, at each pixel, image-processed previous to one frame or a few frames, when otherwise.

13. An apparatus according to claim 12, wherein the image processing means further comprises means for multiplying the selected original image data by a multiplier factor $\alpha$ ($\alpha \geq 1$) and the selected image-processed image data by a multiplier factor $\beta$ ($\beta < 1$).

14. An apparatus according to claim 13, wherein the image processing means further comprises means for varying the multiplier factors $\alpha$ and $\beta$.

15. An apparatus according to claim 13, wherein the multiplier factor $\alpha$ is so set that the selected original image data is displayed at a maximal luminance level or at a pure color tone level.

16. An apparatus according to claim 12, wherein the image processing means further comprises means for adding an addend a ($a \geq 0$) to the selected original image data and an addend b ($b < 0$) to the selected image-processed image data.

17. An apparatus according to claim 16, wherein the image processing means further comprises means for varying the addends a and b.

18. An apparatus according to claim 16, wherein the addend a is so set that the selected original image data is displayed at a maximal luminance level or at a pure color tone level.

19. An apparatus according to claim 12, wherein the image processing means further comprises means for varying the threshold value.

20. An apparatus according to claim 12, further comprising means for composing the image-processed image data onto the original image data.

21. An apparatus according to claim 12, wherein the image processing means takes in the original image data at a rate of once for a plurality of frames and subjects only the taken-in original image data, as an object, to an image processing.

22. An apparatus according to claim 21, further comprising means for computing an area's motion velocity based on both a distance between points in a pair on the same area described in the image data image-processed at a rate of once for a plurality of frames and an image processing executing period.

23. An image processing apparatus comprising:
means for inputting original image data;
image processing means for image-processing the original image data; and
means for displaying the image-processed image data, wherein
the image processing means comprises
means for comparing the original image data, at each pixel, with a predetermined threshold value, and
means for selecting the original data at each pixel when the original image data is higher than the threshold value and the image data, at each pixel, image-processed previous to one frame or a few frames when the original image data is lower than the threshold value.

24. An apparatus according to claim 23, wherein the image processing means further comprises means for multiplying the selected original image data by a multiplier factor $\alpha$ ($\alpha \geq 1$) and the selected image-processed image data by a multiplier factor $\beta$ ($\beta < 1$).

25. An apparatus according to claim 24, wherein the image processing means further comprises means for varying the multiplier factors $\alpha$ and $\beta$.

26. An apparatus according to claim 24, wherein the multiplier factor a is so set that the selected original image data is displayed at a maximal luminance level or at a pure color tone level.

27. An apparatus according to claim 23, wherein the image processing means further comprises means for adding an addend a ($a \geq 0$) to the selected original image data and an addend b ($b < 0$) to the selected image-processed image data.

28. An apparatus according to claim 27, wherein the image processing means further comprising means for varying the addends a and b.

29. An apparatus according to claim 27, wherein the addend a is so set that the selected original image data is displayed at a minimal luminance level or at a pure color tone level.

30. An apparatus according to claim 23, wherein the image processing means further comprises means for varying the threshold value.

31. An apparatus according to claim 23, further comprising means for composing the image-processed image data onto the original image data.

32. An apparatus according to claim 23, wherein the image processing means takes in the original image data at a rate of once for a plurality of frames and subjects only the taken-in original image data, as an object, to image processing.

33. An apparatus according to claim 32, further comprising means for computing an area's motion velocity based on both a distance between points in a pair on the same area described in the image data image-processed at a rate of once for the plurality of frames and an image processing executing period.

34. An image processing apparatus comprising:

means for inputting original image data;

image processing means for image-processing the original image data; and means for displaying the image-processed image data, wherein the image processing means comprises:

means for comparing the original image data with a predetermined threshold value at each pixel;

means for comparing the original image data, at each pixel, with the image data image-processed previous to one frame or a few frames; and means for selecting the original image data at each pixel when the original image data is higher than the threshold value and higher than the image data image-processed previous to one frame or a few frames and image data, at each pixel, image-processed previous to one frame or a few frames when otherwise.

35. An apparatus according to claim 34, wherein the image processing means further comprises means for multiplying the selected original image data by a multiplier factor $\alpha$ ($\alpha \geq 1$) and the selected image-processed image data by a multiplier factor $\beta$ ($\beta<1$).

36. An apparatus according to claim 35, wherein the image processing means further comprises means for varying the multiplier factors $\alpha$ and $\beta$.

37. An apparatus according to claim 35, wherein the multiplier factor a is so set that the selected original image data is displayed at a maximal luminance level or at a pure color tone level.

38. An apparatus according to claim 34, wherein the image processing means further comprises means for adding an addend a ($a \geq 0$) to the selected original image data and an addend b ($b<0$) to the selected image-processed image data.

39. An apparatus according to claim 38, wherein the image processing means further comprises means for varying the addends a and b.

40. An apparatus according to claim 38, wherein the addend a is so set that the selected original image data is displayed at a maximal luminance level or at a pure color tone level.

41. An apparatus according to claim 34, wherein the image processing means further comprises means for varying the threshold value.

42. An apparatus according to claim 34, further comprising means for composing the image-processed image data onto the original image data.

43. An apparatus according to claim 34, wherein the image processing means takes in the original image data at a rate of once for a plurality of frames and subjects only the taken-in original image data, as an object, to image processing.

44. An apparatus according to claim 43, further comprising means for computing an area's motion velocity based on both a distance between points in a pair on the same area described in the image data image-processed at a rate of once for a plurality of frames and an image processing executing period.

45. An ultrasonic diagnostics apparatus comprising:

an ultrasonic probe configured to transmit ultrasound to a to-be-examined subject and to receive an ultrasound echo from the to-be-examined subject;

an transmitting/receiving circuit configured to apply a drive pulse to the ultrasound probe and to generate an original B-mode image data based on an output signal of the ultrasound probe;

an image processor configured to generate an image-processed image data based on the original B-mode data and previous image-processed image data, so that when a pixel value in the original image data is higher than a predetermined threshold value and higher than the pixel value in previous image-processed image data, the pixel value in the image-processed image data is generated based on the original B-mode image data, and when the pixel value in the original image data is lower than the predetermined threshold value or lower than the pixel value in previous image-processed image data, the pixel value in the image-processed image data is generated based on a level downed previous image-processed image data; and a display configured to display an image based on the image-processed image data.

* * * * *